US007905768B2

(12) United States Patent
Aandewiel et al.

(10) Patent No.: US 7,905,768 B2
(45) Date of Patent: Mar. 15, 2011

(54) DEVICE FOR PICKING OR PLUCKING POULTRY-FEATHERS AND AN APPARATUS FOR DRIVING SUCH A DEVICE

(75) Inventors: Leendert Aandewiel, Oostzaan (NL); Aloysius Christianus Maria Van Steijn, Oostzaan (NL); Albert Beeksma, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 12/560,513

(22) Filed: Sep. 16, 2009

(65) Prior Publication Data
US 2010/0075584 A1    Mar. 25, 2010

(30) Foreign Application Priority Data

Sep. 16, 2008   (NL) .................................... 2001989

(51) Int. Cl.
*A22C 21/02*        (2006.01)
(52) U.S. Cl. .......................................................... 452/86
(58) Field of Classification Search ............. 452/86–101
See application file for complete search history.

(56) References Cited

U.S. PATENT DOCUMENTS

| 3,870,371 | A | * | 3/1975 | Solomon ........................... 301/1 |
| 4,175,302 | A | * | 11/1979 | Scheier et al. ................... 452/93 |
| 4,330,903 | A | * | 5/1982 | Vilotti .............................. 452/92 |
| 5,584,689 | A | * | 12/1996 | Loge .............................. 433/128 |
| 6,497,615 | B1 | * | 12/2002 | Klager ........................... 452/101 |
| 7,648,412 | B2 | * | 1/2010 | Kjeldsen ......................... 452/88 |
| 2006/0183415 | A1 |  | 8/2006 | Turner |

FOREIGN PATENT DOCUMENTS
DE        199 22 618 A1    12/2000
NL        9201947          11/1992

OTHER PUBLICATIONS

Search report and written opinion for NL2001989, dated Dec. 29, 2008.

* cited by examiner

*Primary Examiner* — Thomas Price
(74) *Attorney, Agent, or Firm* — Dority & Manning, P.A.

(57) ABSTRACT

A device for picking or plucking poultry feathers is provided that includes a sleeve-coupling and, connected or connectable thereto, a plucking plate with receptacles for plucking fingers, which sleeve-coupling is mountable on a drive-shaft for the plucking plate. The sleeve-coupling is provided with a circumferentially extending slot for receipt of a radially extending pin that is provided on the drive-shaft, and the circumferentially extending slot has an opening between the slot-extremities to allow the pin to enter and to exit the slot so as to securely mount the sleeve coupling on the drive shaft with the pin being located at one of the slot extremities.

8 Claims, 6 Drawing Sheets

DEVICE FOR PICKING OR PLUCKING POULTRY-FEATHERS AND AN APPARATUS FOR DRIVING SUCH A DEVICE

FIELD OF THE INVENTION

The invention relates to a device for picking or plucking poultry-feathers comprising a sleeve-coupling and connected or connectable thereto a plucking plate with receptacles for plucking fingers, which sleeve-coupling is mountable on a drive-shaft for the plucking plate. The invention furthers relates to an apparatus for driving such a device or devices.

BACKGROUND OF THE INVENTION

US 2006/0183415 A1 teaches a device for picking or plucking poultry-feathers that is provided with a sleeve coupling that is coupled to a base-plate which is provided with apertures in which a plurality of plucking fingers are inserted. A backing plate is provided to abut the rear of the base-plate preventing accidental displacement of the rubber picker fingers from the base-plate. The sleeve-coupling of the known device is shaped to accommodate a driving axle with a particular predefined shape. However, the secure mounting of this known device to a drive-shaft requires a complicated construction embodied with opposing side clamps that are intended to cooperate with recesses of a locking bolt.

From NL-A 9201947 a device for picking or plucking poultry-feathers is known that is provided with a plucking plate with receptacles for plucking fingers. The plucking plate is mounted on a drive-shaft and secured thereto with a bolt.

SUMMARY OF THE INVENTION

Objects and advantages of the invention will be set forth in part in the following description, or may be obvious from the description, or may be learned through practice of the invention.

It is one object of the invention to alleviate mounting and dismounting of the device according to the preamble. It is a further object of the invention to obviate the need to use any auxiliary instruments when mounting or dismounting the device.

It is still a further object of the invention to simplify the construction of the device for picking of plucking poultry-feathers.

The device and the apparatus of the invention are embodied in accordance with one or more of the appended claims.

In a first aspect of the invention the device for picking of plucking poultry-feathers having a sleeve-coupling for mounting on a drive-shaft is characterised in that, the sleeve-coupling is provided with a circumferentially extending slot for receipt of a radially extending pin that is provided on the drive-shaft, and that the circumferentially extending slot has an opening between the slot-extremities, to allow the pin to enter and to exit the slot, so that the sleeve-coupling is securely mounted on the drive-shaft with the pin being located at one of the slot-extremities.

Not only is the device of the invention by this measure secured against loosening from the drive-shaft; it also allows for easily mounting and dismounting the device, particularly by application of the feature that the opening is provided in an edge of the sleeve-coupling bordering the circumferentially extending slot and facing away from the plucking plate.

It is further advantageous that the edge of the sleeve-coupling that borders the slot is thickest immediately adjacent to the opening in the edge, and gradually diminishes in thickness up to a lowest thickness adjacent to the slot-extremities. This improves the secure mounting of the device on the corresponding drive-shaft.

A further beneficial arrangement of the device is characterised in that the sleeve-coupling has two circumferentially extending slots that are opposite to each other so as to cooperate with two pins on the drive-shaft that are radially extending therefrom on opposite sides of said drive-shaft. This allows that the mounting of the device on a drive-shaft is and remains well balanced, also during operation of the device.

In a further aspect of the invention the sleeve-coupling has at its inner sleeve-wall a recess for receipt of a resiliently and radially extendable ring or pin that is mounted on the drive-shaft. This helps to ensure that when the ring or pin of the drive-shaft is not located in one of the extremities of the slot that extends circumferentially in the wall of the sleeve, the coupling will not unintentionally get dismounted from the provided surface, drive-shaft.

On the other hand it is advantageous that the recess is with a slope towards the sleeve-coupling's inner wall at the part of the recess facing away from the plucking plate. By this measure it still remains possible to manually dismount the device from a drive-shaft by the application of a moderate manual pulling force.

The invention is also embodied in an apparatus for driving a plurality of devices as discussed above. Such an apparatus is provided with a plurality of driving-shafts whereby each shaft is suited for driving one device for picking or plucking poultry-feathers. In accordance with this embodiment of the invention each such shaft is provided with at least one pin radially extending therefrom and arranged for cooperating with a circumferentially extending slot in the sleeve-coupling of such a plucking device.

The invention will hereinafter be further elucidated with reference to the drawing of an exemplary embodiment and without limiting the scope of the appended claims.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Same reference-numerals applied in the figures refer to similar parts.

DETAILED DESCRIPTION OF THE INVENTION

Figure 1:
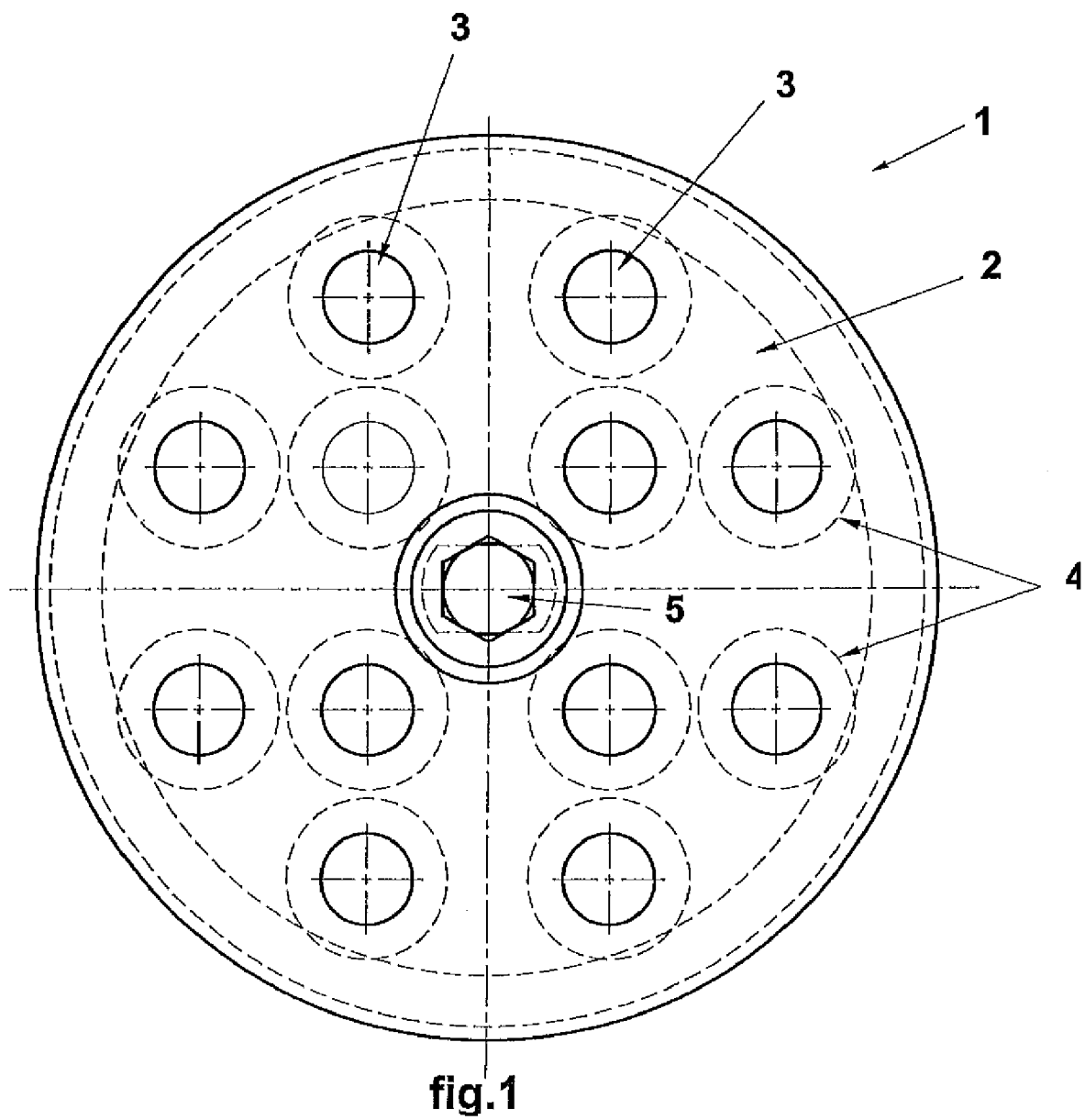
FIG. 1 shows a top view of the plucking device of the invention.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

With reference first to FIG. 1 a top view is shown of the device 1 for picking or plucking poultry-feathers. In particular the plucking plate 2 of this device 1 is shown to have receptacles (apertures) 3 through which plucking fingers 4 are inserted which are operative for the picking or plucking of the poultry-feathers when the device 1 is in operation. During operation the device 1, in particular the plucking plate 2, is rotated around its axis 5, which is coaxial with a drive-shaft (shown in FIG. 2) of an apparatus for driving a plurality of such plucking devices. To this end the drive-shaft 6 of the driving apparatus for the plucking device 1 may rotate clockwise or counter-clockwise, and the device 1 of the invention is arranged such that when mounting the device 1 on a drive-shaft 6 no account has to be taken for whether the concerning drive-shaft 6 rotates clockwise or counter-clockwise. This will become apparent from the further disclosure hereinafter.

Figure 2:
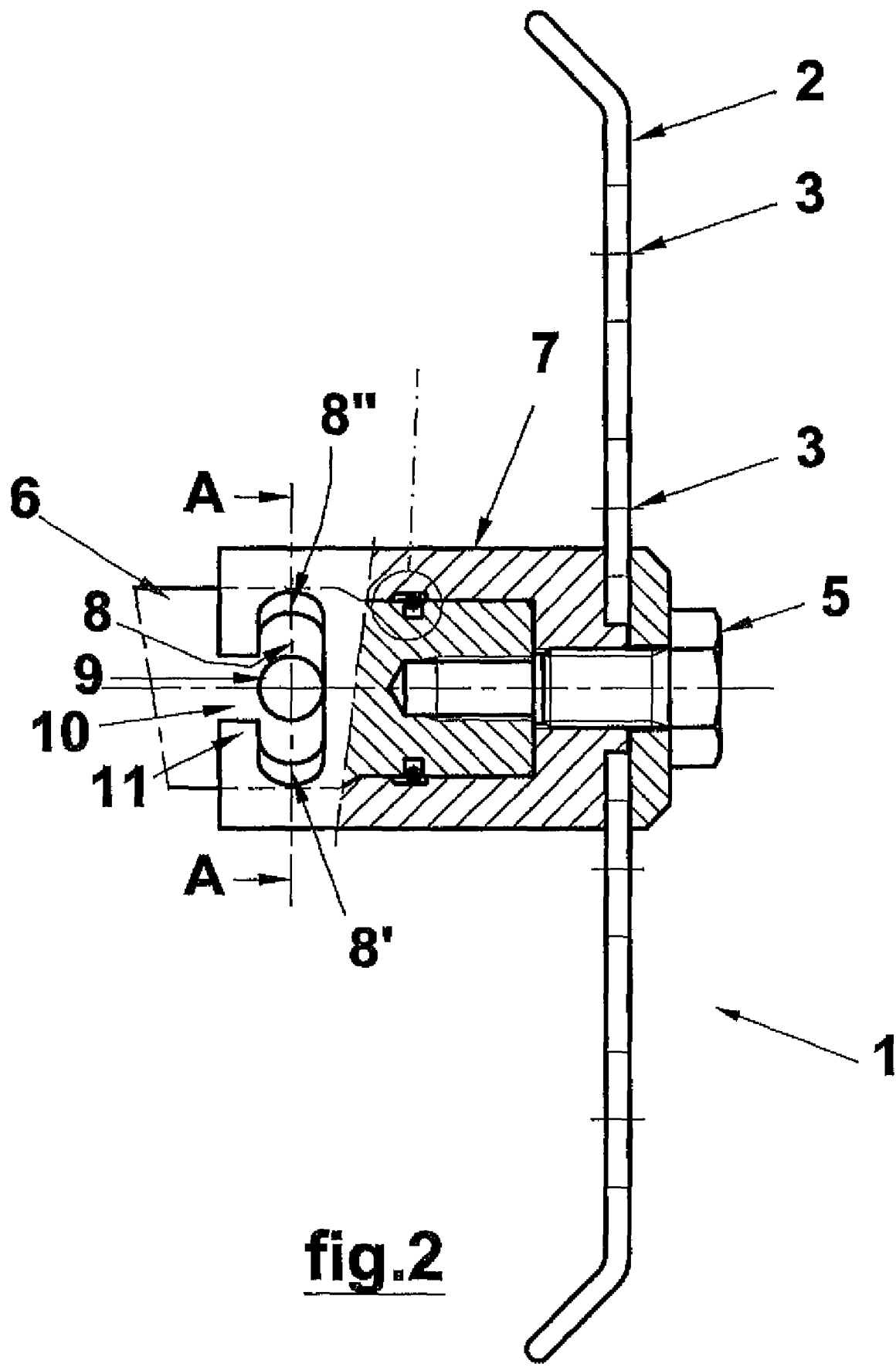
FIG. 2 shows a side view, partly in cross section, of the device shown in FIG. 1.

FIG. 2 shows the device of FIG. 1 in a side view, partially in cross section. For sake of clarity the plucking fingers 4 shown in FIG. 1 are not depicted in FIG. 2. For the artisan it is clear, however, that such plucking fingers extend from the plucking plate 2 as shown in FIG. 2 to the right hand thereof.

FIG. 2 shows that the plucking plate 2 is connected or connectable to a sleeve-coupling 7 which sleeve-coupling 7 is mountable on the earlier mentioned drive-shaft 6 of an apparatus for driving the device 1 through rotation of the drive shaft 6.

FIG. 2 clearly further shows that the sleeve-coupling 7 is provided with a circumferentially extending slot 8 which is arranged for receipt of a radially extending pin 9 (see also FIG. 3) that is provided on the drive-shaft 6.

It is further shown that the circumferentially extending slot 8 has an opening 10 between the slot extremities 8', 8" to allow said pin 9 to enter and to exit the slot 8, so as to cause that when the pin 9 is located at one of these slot extremities 8', 8", the sleeve-coupling 7 will be securely mounted on the drive-shaft 6.

FIG. 2 further shows that the opening 10 is provided in an edge 11 of the sleeve-coupling 7 bordering the circumferentially extending slot 8 at the part that faces away from the plucking plate 2.

Figure 4:
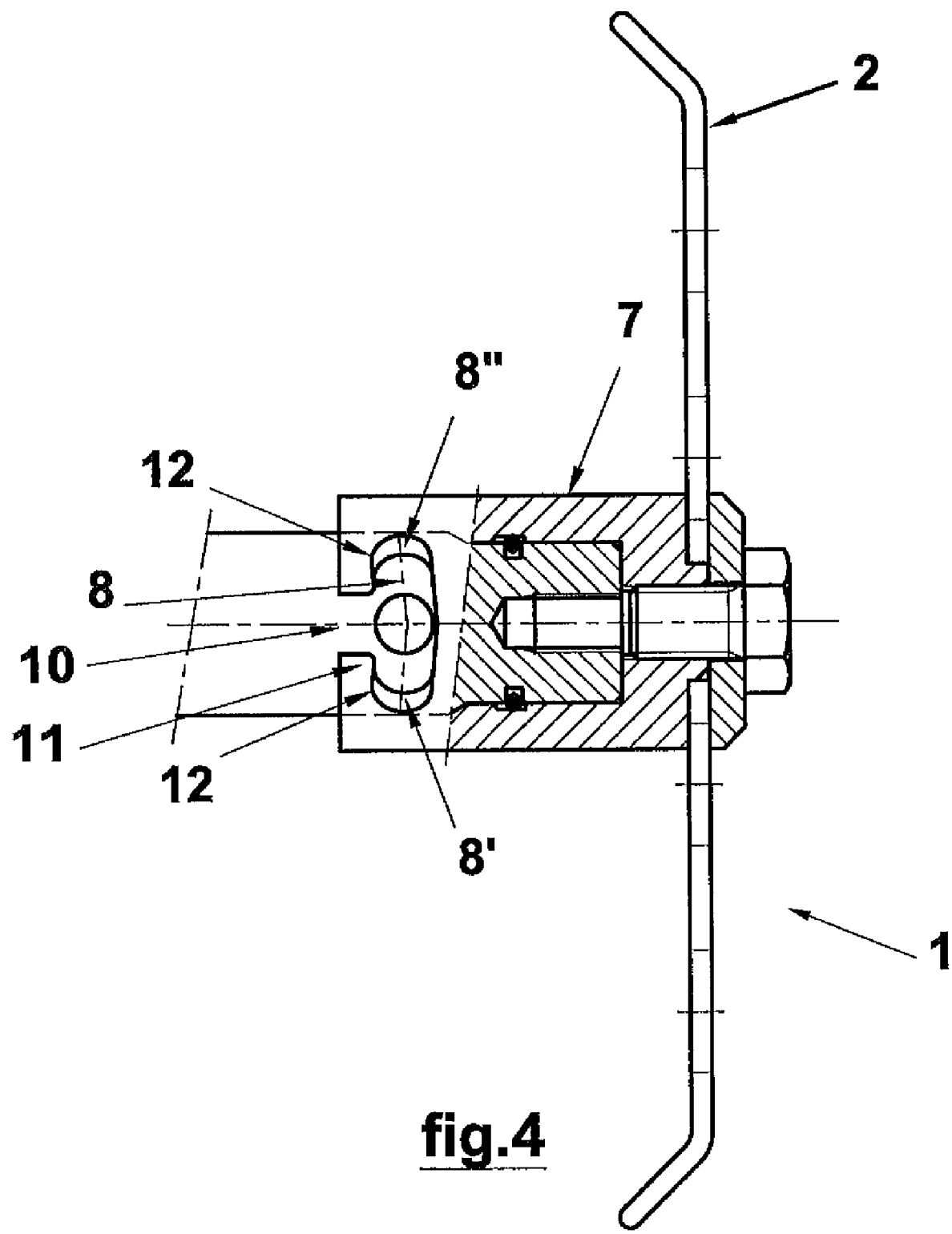
FIG. 4 shows a second embodiment of the device in a view corresponding to FIG. 2.

With reference to FIG. 4 an embodiment is shown in which the edge 11 of the sleeve-coupling 7 has a varying thickness such that the edge 11 is at its thickest value immediately adjacent to the opening 10 in the edge, and then gradually diminishes in thickness up to a point where it arrives at its lowest thickness value at the part 12 that is immediately adjacent to the slot extremities 8', 8".

Figure 3:
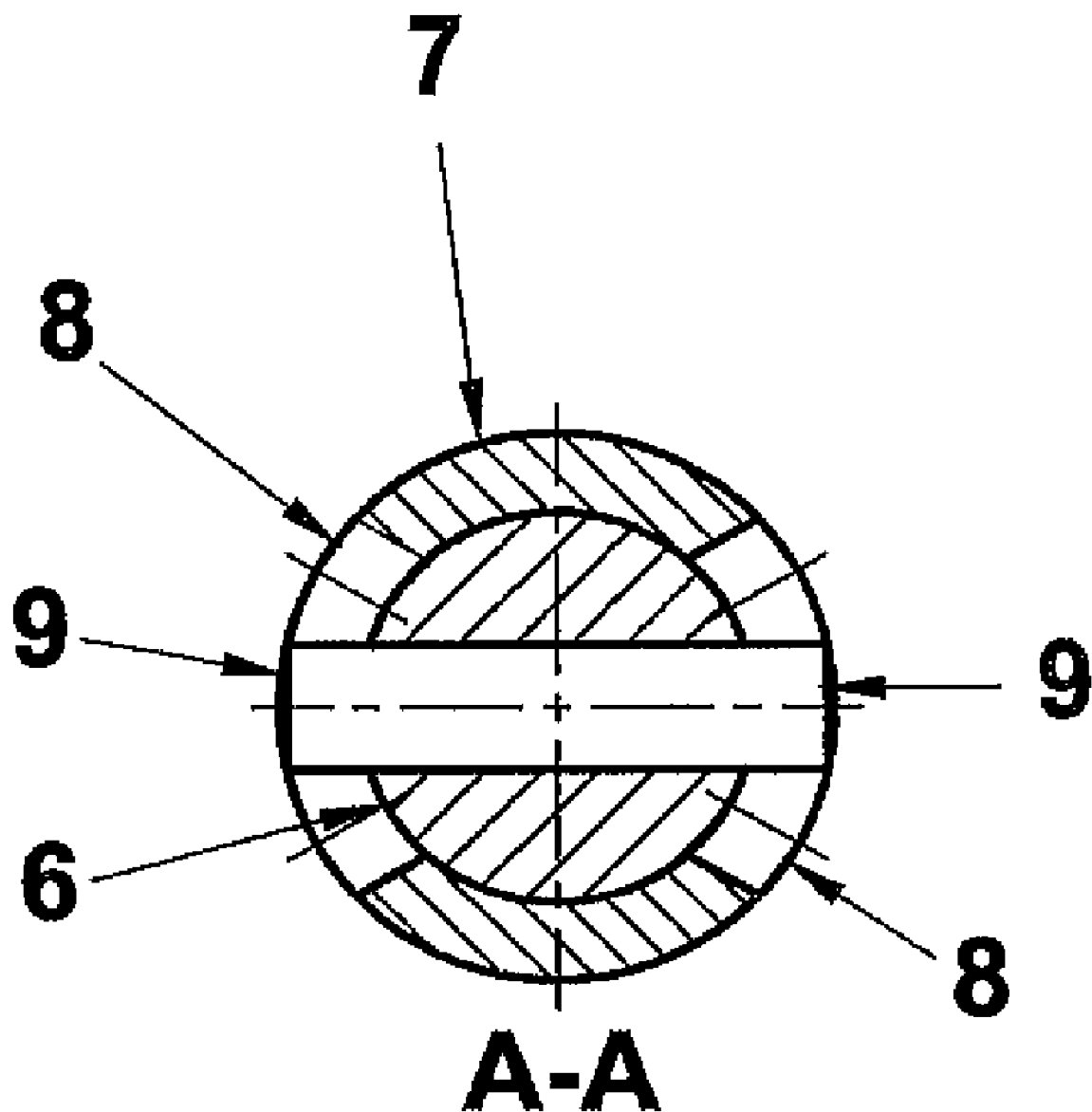
FIG. 3 shows a cross section according to the line A-A in FIG. 2.

FIG. 3 shows a preferred embodiment in which the sleeve-coupling 7 has two circumferentially extending slots 8 that are located opposite to each other, so as to cooperate with two pins 9 on the drive-shaft 6 that are radially extending from said drive-shaft 6 on opposite sides thereof.

Figure 5:
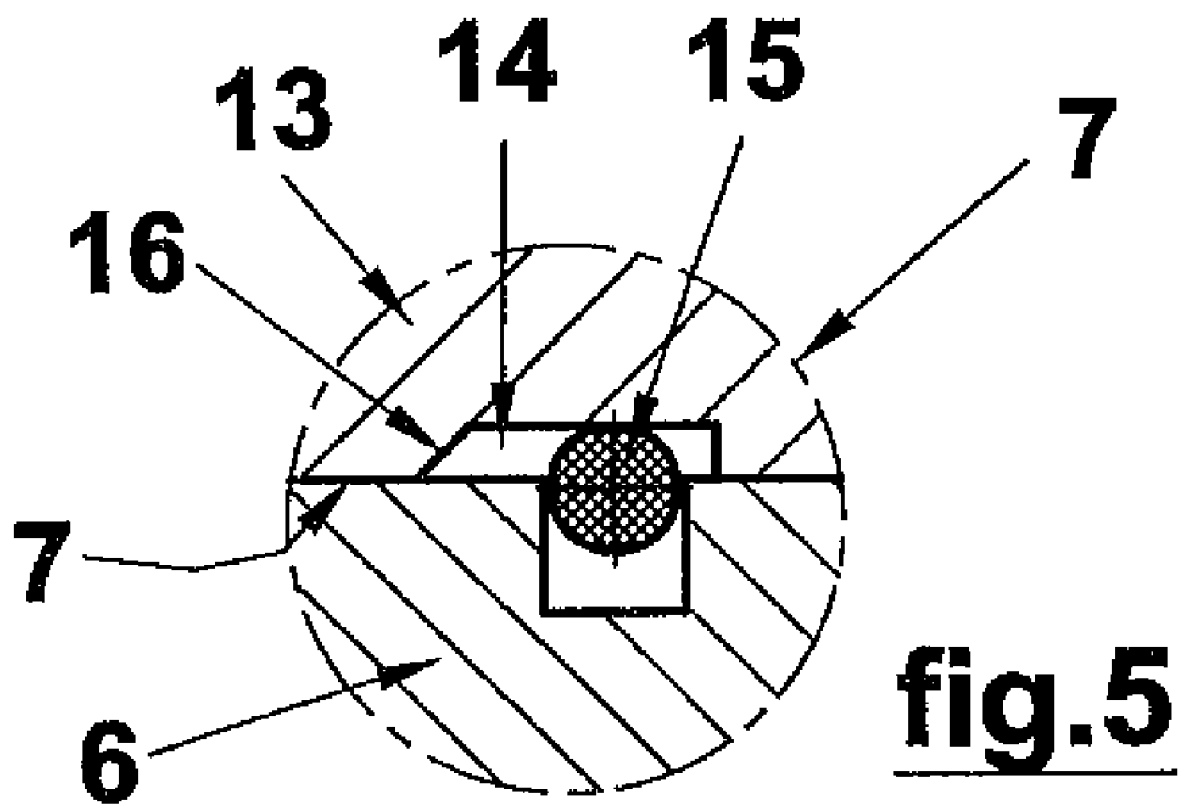
FIG. 5 shows a detail view of part of the device shown in FIG. 2.

With reference to FIG. 2 and the detail view of FIG. 5 it is shown that the sleeve-coupling 7 has at its inner sleeve wall 13 (see FIG. 5) a recess 14 for receipt of a resiliently and radially extending ring 15 or pin, which ring 15 or pin is mounted on the drive-shaft 6. The recess 14 in the inner sleeve wall 13 of the sleeve-coupling 7 is preferably provided with a slope 16 towards the sleeve-coupling's 7 inner wall surface 17 at the part of the recess 14 that faces away from the plucking plate 2. This facilitates the ease of dismounting the device 1, in particular its sleeve-coupling 7 from the driving shaft 6 while it simultaneously prevents the unintended dismounting thereof.

Figure 6:
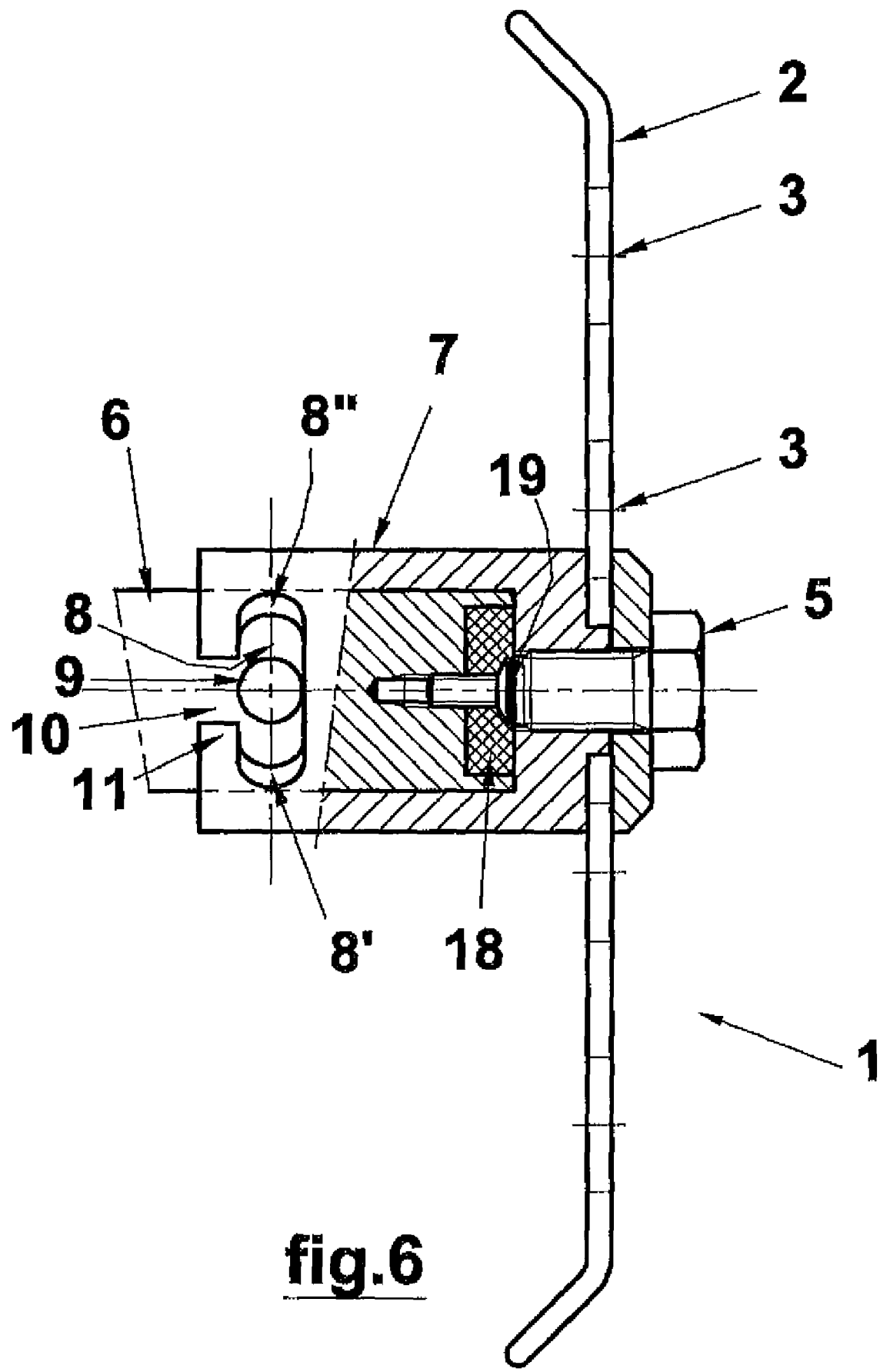
FIG. 6 shows a third embodiment of the device in a view corresponding to FIG. 2.

An alternative embodiment of the device 1 that prevents unintended dismounting of the sleeve-coupling 7 from the drive-shaft 6, yet still facilitates the ease of their dismounting is shown in FIG. 6. In this embodiment the drive shaft 6 and the sleeve-coupling 7 are at least in part provided with cooperating magnetic materials. This can be effected by mounting a magnet 18 on the top of the drive shaft 6 and fixing it with a bolt 19. Also the sleeve-coupling 7 may be provided with a magnet, or alternatively may be made from a magnetic material.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. A device for picking or plucking poultry feathers, comprising:
   a sleeve-coupling;
   a plucking plate with receptacles for plucking fingers, said plucking plate connected or connectable to said sleeve coupling,
   at least one drive shaft for said plucking plate, said sleeve-coupling being mountable to said drive shaft;
   wherein said sleeve-coupling is provided with a circumferentially extending slot for receipt of a radially extending pin that is provided on said drive-shaft, the circumferentially extending slot including an opening between the slot extremities to allow the pin to enter and to exit the slot, so that the sleeve-coupling is securely mounted on the drive-shaft with the pin being located at one of the slot-extremities.

2. A device for picking or plucking poultry feathers as in claim 1, wherein the opening is provided in an edge of the sleeve-coupling bordering the circumferentially extending slot and facing away from the plucking plate.

3. A device for picking or plucking poultry feathers as in claim 2, wherein the edge of said sleeve-coupling that borders the slot is thickest immediately adjacent to the opening in the edge and gradually diminishes in thickness up to a lowest thickness adjacent to the slot-extremities.

4. A device for picking or plucking poultry feathers as in claim 1, wherein said sleeve-coupling has two circumferentially extending slots that are opposite to each other so as to cooperate with two pins on the drive-shaft that are radially extending from said drive shaft on opposite sides of said drive-shaft.

5. A device for picking or plucking poultry feathers as in claim 1, wherein the said sleeve-coupling has an inner sleeve-wall that include a recess for receipt of a resiliently and radially extendable ring or pin that is mounted on said drive-shaft 6. A device for picking or plucking poultry feathers as in claim 1, wherein the recess is provided with a slope towards said sleeve-coupling's inner wall surface, at the part of the recess facing away from said plucking plate.

7. A device for picking or plucking poultry feathers as in claim 1, wherein said drive-shaft and said sleeve-coupling comprise are at least in part provided with cooperating magnetic materials.

8. A device for picking or plucking poultry feathers as in claim 1, further comprising:

a plurality of driving-shafts, wherein each shaft is provided with at least one pin radially extending from said shaft and arranged for cooperating with a circumferentially extending slot in said sleeve-coupling of the device.

* * * * *